(12) United States Patent
Rosborough

(10) Patent No.: US 10,697,300 B2
(45) Date of Patent: Jun. 30, 2020

(54) ROTOR BALANCE WEIGHT SYSTEM

(71) Applicant: United Technologies Corporation, Farmington, CT (US)

(72) Inventor: Richard W. Rosborough, Durham, CT (US)

(73) Assignee: Raytheon Technologies Corporation, Farmington, CT (US)

(*) Notice: Subject to any disclaimer, the term of this patent is extended or adjusted under 35 U.S.C. 154(b) by 113 days.

(21) Appl. No.: 15/841,882

(22) Filed: Dec. 14, 2017

(65) Prior Publication Data

US 2019/0186266 A1 Jun. 20, 2019

(51) Int. Cl.
*F01D 5/02* (2006.01)
*H02K 15/16* (2006.01)
*G01M 1/32* (2006.01)
*G01M 1/16* (2006.01)

(52) U.S. Cl.
CPC ............... *F01D 5/027* (2013.01); *G01M 1/32* (2013.01); *H02K 15/165* (2013.01); *F05D 2250/132* (2013.01); *F05D 2250/241* (2013.01); *F05D 2260/31* (2013.01); *F05D 2260/36* (2013.01); *F05D 2260/37* (2013.01); *G01M 1/16* (2013.01)

(58) Field of Classification Search
CPC .................................. F01D 5/027; G01M 1/32
See application file for complete search history.

(56) References Cited

U.S. PATENT DOCUMENTS

| 3,736,811 | A | | 6/1973 | Neary | |
|---|---|---|---|---|---|
| 4,265,595 | A | * | 5/1981 | Bucy, Jr. | F01D 5/3007 416/220 R |
| 4,842,485 | A | * | 6/1989 | Barber | F01D 5/027 411/104 |
| 6,279,420 | B1 | * | 8/2001 | Knorowski | B25B 13/48 409/141 |
| 6,481,969 | B2 | * | 11/2002 | Berry | F01D 5/027 416/145 |
| 6,893,222 | B2 | | 5/2005 | Allam | |
| 8,888,458 | B2 | | 11/2014 | Billings et al. | |
| 10,364,688 | B2 | * | 7/2019 | Hummel | G01M 1/36 |
| 2004/0156708 | A1 | * | 8/2004 | Allam | B23P 6/002 415/144 |

(Continued)

OTHER PUBLICATIONS

European Search Report dated May 24, 2019 for European Patent Application No. 18212247.3.

*Primary Examiner* — Ninh H. Nguyen
*Assistant Examiner* — Behnoush Haghighian
(74) *Attorney, Agent, or Firm* — Bachman & LaPointe, P.C.

(57) ABSTRACT

A rotor has a rotor body having: a flange with a circumferential array of discontiguous apertures; and a surface spaced apart from the flange. One or more rotor balance weight assemblies each have a weight and a fastener. The weight has: a passageway having a first end and a second end; an internal thread along the passageway; and a boss at the first end of the passageway. The boss is in a respective one of the apertures. The fastener has: a shank having a first end and a second end and an external thread engaged to the passageway internal thread; an engagement feature at the shank first end for engagement by a tool to turn the fastener; and a head at the second end contacts the surface.

19 Claims, 3 Drawing Sheets

(56) References Cited

U.S. PATENT DOCUMENTS

| | | | |
|---|---|---|---|
| 2005/0025625 A1* | 2/2005 | Escure | F01D 5/066 416/198 A |
| 2005/0265846 A1* | 12/2005 | Przytulski | F01D 5/027 416/144 |
| 2010/0080689 A1* | 4/2010 | Lee | F01D 5/027 415/119 |
| 2010/0080705 A1* | 4/2010 | Pronovost | F01D 5/027 416/144 |
| 2011/0027085 A1* | 2/2011 | Glasspoole | F01D 5/027 416/145 |
| 2011/0044816 A1* | 2/2011 | Lecuyer | F01D 5/027 416/144 |
| 2011/0078901 A1* | 4/2011 | Glasspoole | F01D 5/027 29/889 |
| 2012/0207603 A1* | 8/2012 | Woods | F01D 5/027 416/145 |
| 2013/0236310 A1* | 9/2013 | Billings | F01D 5/027 416/144 |
| 2016/0069267 A1* | 3/2016 | Philbrick | F16B 39/021 416/204 A |
| 2016/0273771 A1* | 9/2016 | Cunha | F01D 5/188 |
| 2018/0045057 A1* | 2/2018 | Tallman | F01D 9/041 |

* cited by examiner

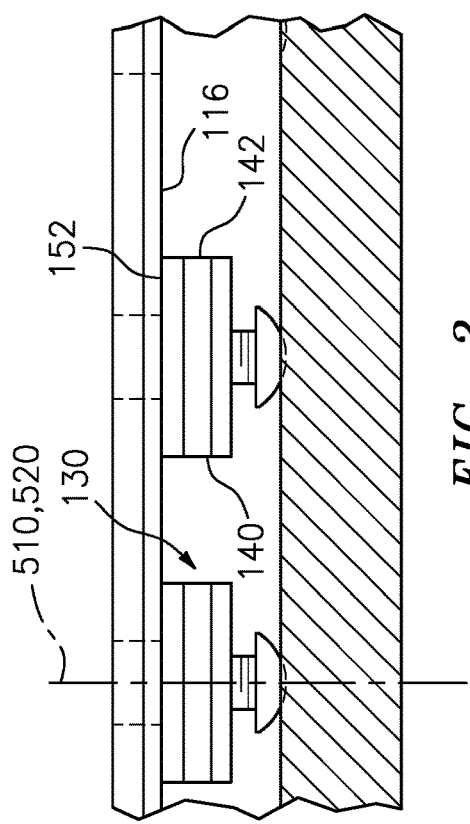
FIG. 2
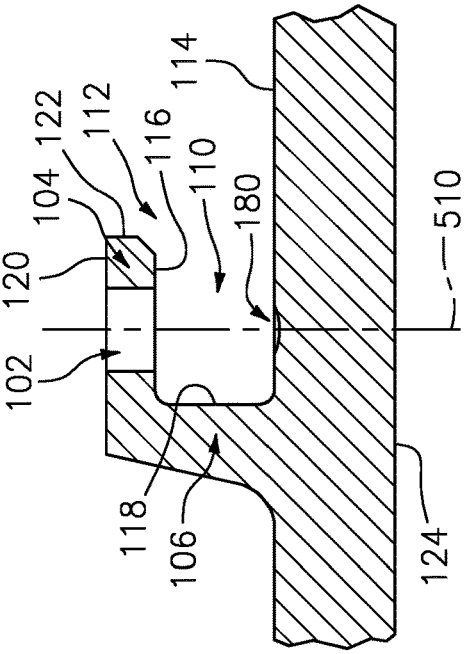
FIG. 3
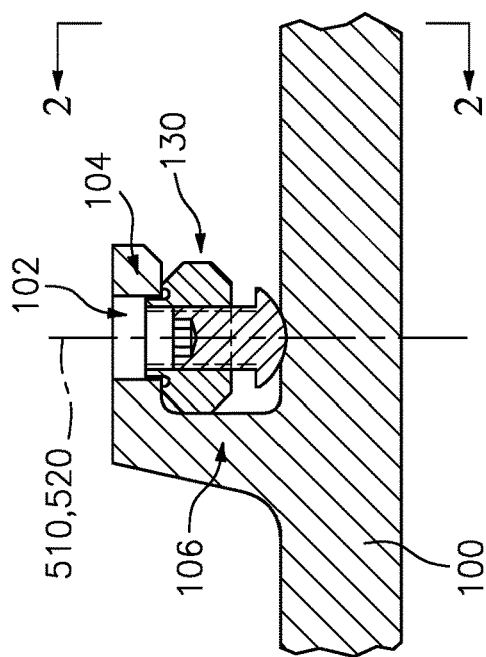
FIG. 1A
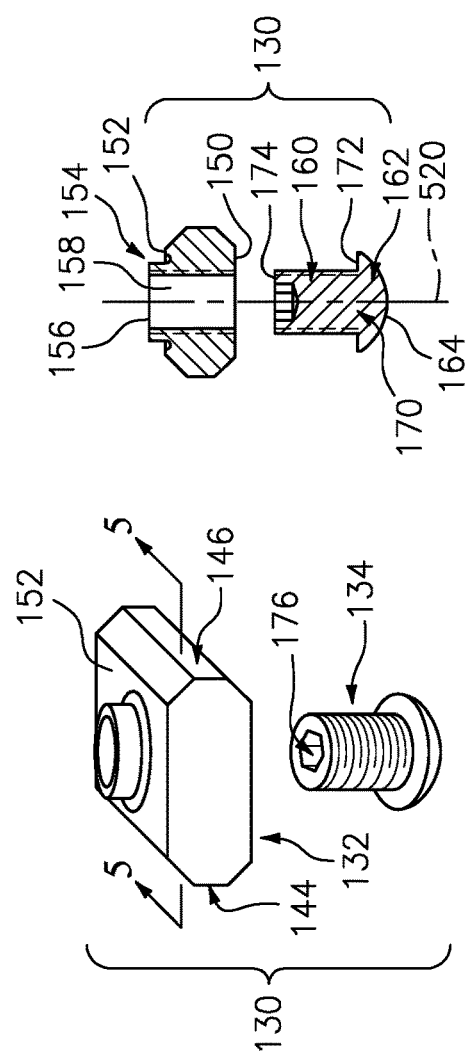
FIG. 5
FIG. 4

ROTOR BALANCE WEIGHT SYSTEM

BACKGROUND

This disclosure relates to balancing of turbomachine rotors by the addition of weights, and more particularly to weights' attachment features.

The dynamic balancing of turbine rotors is a well-developed art. Each rotor may have, at one or more longitudinal locations, a circumferential array of mounting features permitting the installation of one or more balance weights.

It is known, for example, to balance a rotor by using a computer controlled apparatus to spin the rotor about its rotational axis and measure the parameters of rotational displacements (vibrations) associated with imbalance. Based upon these measurements, the computer outputs an identification of a particular combination of balance weights to balance the rotor. Specifically, the computer may identify particular weight masses to be installed at one to all of the individual mounting locations defined by the mounting features.

A number of different mounting feature constructions are known. An axially protruding flange is shown in U.S. Pat. No. 6,893,222 of Allam (the '222 patent). A radially inwardly projecting flange is shown in U.S. Pat. No. 8,888,458 of Billings et al. (the '458 patent). The '222 patent and the '458 patent illustrate fastening rivets.

US Patent Publication 2005/0265846A1 of Przytulski et al. (the '846 publication) discloses weights accommodated in a radially outwardly open channel. Each weight assembly comprises a weight having a generally radially oriented internally threaded passageway accommodating the threaded shank of a fastener. An inner diameter (ID) end of the fastener engages a base of the channel. The channel has a relatively broad base and narrow outer diameter (OD) opening or neck so that OD shoulders of the weight are biased into contact with the channel wall along the neck to hold the weight in place. The OD end of the fastener has a feature for engaging a tool to tighten the weight in place. The exemplary weight is installed without the fastener, allowing the weight to be inserted at an angle through the slot opening and then righted. Thereafter, the fastener may be inserted radially. In further variations on this system, the slot has an alternating series of broad and narrow portions. The broad portions allow the weight to be inserted with the fastener (so that the fastener axis is essentially radial). The weight may then be shifted circumferentially to one of the narrow portions of the opening and then actuated to drive the weight radially outward and into engagement with the neck.

SUMMARY

One aspect of the disclosure involves a rotor having a rotor body having: a flange with a circumferential array of discontiguous apertures; and a surface spaced apart from the flange. One or more rotor balance weight assemblies each have a weight and a fastener. The weight has: a passageway having a first end and a second end; an internal thread along the passageway; and a boss at the first end of the passageway. The boss is in a respective one of the apertures. The fastener has: a shank having a first end and a second end and an external thread engaged to the passageway internal thread; an engagement feature at the shank first end for engagement by a tool to turn the fastener; and a head at the second end contacts the surface.

A further embodiment of any of the foregoing embodiments may additionally and/or alternatively include the circumferential array of apertures being 8 to 100 apertures.

A further embodiment of any of the foregoing embodiments may additionally and/or alternatively include the flange being an axial flange.

A further embodiment of any of the foregoing embodiments may additionally and/or alternatively include: said surface having a plurality of recesses, each aligned with a respective associated one of the apertures; and the fastener head is in the recess associated with the associated one of the apertures.

A further embodiment of any of the foregoing embodiments may additionally and/or alternatively include each said recess being blind.

A further embodiment of any of the foregoing embodiments may additionally and/or alternatively include each said recess being doubly concave.

A further embodiment of any of the foregoing embodiments may additionally and/or alternatively include each said head lacking engagement features for tool engagement.

A further embodiment of any of the foregoing embodiments may additionally and/or alternatively include each said head being doubly convex.

A further embodiment of any of the foregoing embodiments may additionally and/or alternatively include each said engagement feature being a socket.

A further embodiment of any of the foregoing embodiments may additionally and/or alternatively include the socket being a hex socket.

A further embodiment of any of the foregoing embodiments may additionally and/or alternatively include each said weight consisting essentially of stainless steel or nickel alloy.

A further embodiment of any of the foregoing embodiments may additionally and/or alternatively include each said boss protruding from a singly convex surface portion of the weight.

A further embodiment of any of the foregoing embodiments may additionally and/or alternatively include the one or more rotor balance weight assemblies being fewer in number than the circumferential array of apertures.

A further embodiment of any of the foregoing embodiments may additionally and/or alternatively include each shank first end being subflush to a rim of the respective associated boss.

A further embodiment of any of the foregoing embodiments may additionally and/or alternatively include a plurality of stages of blades.

A further embodiment of any of the foregoing embodiments may additionally and/or alternatively include each fastener shank being in compression between the surface and the associated weight.

A further embodiment of any of the foregoing embodiments may additionally and/or alternatively include a gas turbine engine comprising the rotor.

A further embodiment of any of the foregoing embodiments may additionally and/or alternatively include a method for assembling the rotor. The method comprises for each of the one or more rotor balance weight assemblies: with the fastener in a relatively retracted condition contacting the fastener head with the surface; engaging a tool to the engagement feature; and using the tool to turn the fastener to extend the fastener and drive the boss into the respective associated aperture.

A further embodiment of any of the foregoing embodiments may additionally and/or alternatively include spinning the rotor and determining balance of the rotor and wherein the one or more rotor balance weight assemblies improve balance of the rotor.

A related aspect is an associated rotor body having: a flange with a circumferential array of apertures; and a surface spaced apart from the flange and having a plurality of recesses, each aligned with a respective associated one of the apertures.

An assembly method comprises, for each of the one or more rotor balance weight assemblies: with the fastener in a relatively retracted condition seating the fastener head in the respective associated recess; engaging a tool to the engagement feature; and using the tool to turn the fastener to extend the fastener and drive the boss into the respective associated aperture.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1A is an enlarged view of an aft balancing location on a high pressure compressor (HPC) of the rotor shaft of the engine.

FIG. 2 is a partial forward view of the aft balancing location.

FIG. 3 is a view of the aft balancing location without a balance weight.

FIG. 4 is an exploded view of a balance weight.

FIG. 5 is a longitudinal/axial sectional view of the balance weight of FIG. 4 taken along line 5-5.

Like reference numbers and designations in the various drawings indicate like elements.

DETAILED DESCRIPTION

Figure 1:
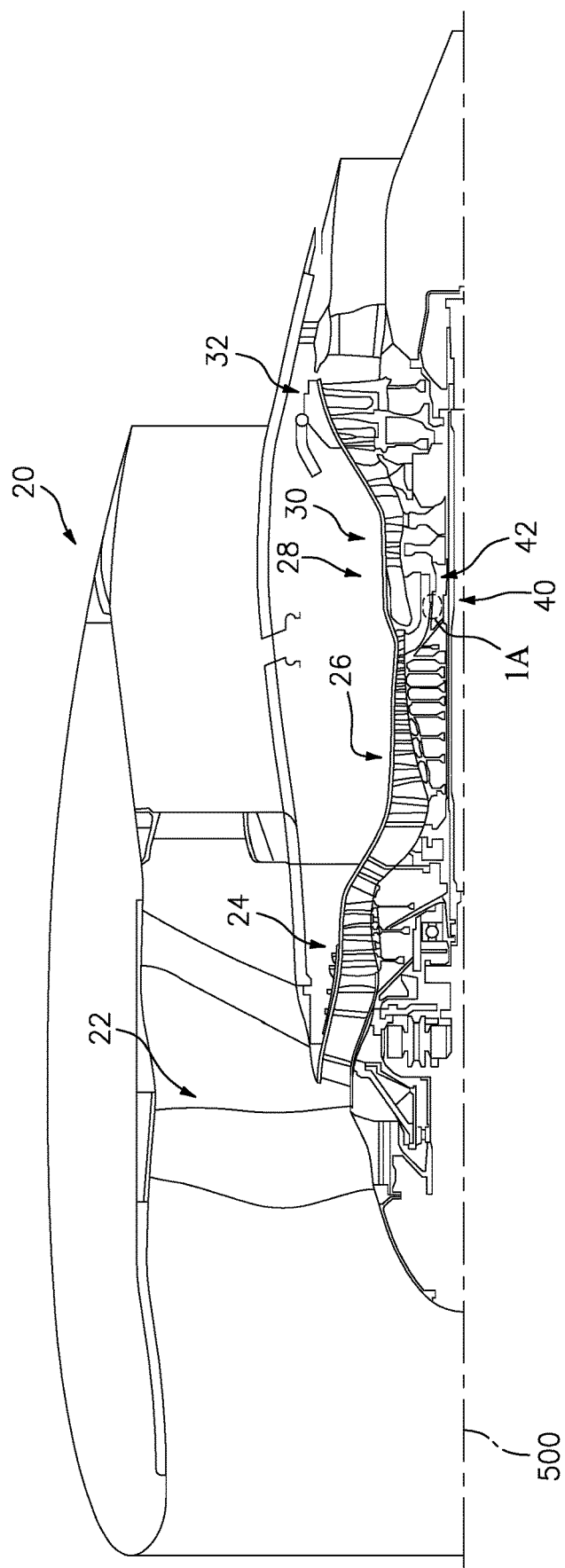
FIG. 1 is a partial, partially schematic longitudinal sectional view of a turbofan engine.

FIG. 1 shows an exemplary turbomachine as a turbine engine, namely a turbofan engine 20. The exemplary engine 20 has a centerline or central longitudinal axis 500. From forward to aft and upstream to downstream, the engine comprises various sections including a fan 22, a low pressure compressor (LPC) 24, a high pressure compressor (HPC) 26, a combustor 28, a high pressure turbine (HPT) 30, and a low pressure turbine (LPT) 32. Each of the LPC, HPC, HPT, and LPT comprise multiple stages of blades interspersed with associated stages of vanes. The blade stages of the LPC are coupled to the blade stages of the LPT via a shaft 40 to be driven by the LPT. Similarly, the blade stages of the HPC are coupled to the blade stages of the HPT via a shaft 42. The LPT and LPC blade stages and their associated shaft may form a low pressure spool. Similarly, the HPC and HPT blade stages and their associated shaft may form a high pressure spool. The spools may be mounted for rotation about the centerline 500 via bearing systems (not shown). The rotating portions of the LPC, HPC, HPT, and LPT may form associated rotors.

Each of the rotors may be balanced via balance weights. Each rotor may include one or more circumferential arrays of weight mounting features such as those described above. One particular location is shown in FIG. 1A along an aft shaft portion 100 of the HPC rotor shaft. The exemplary location is just ahead of a junction (e.g., splined) with a forward portion of the HPT rotor shaft.

The exemplary circumferential array of mounting features comprises a circumferential array of radial holes 102 in an axial flange 104. As distinguished from variations on the '846 publication, these holes are discrete/discontiguous rather than being arbitrary portions of an annular slot. The axial flange 104 extends aftward from a junction with a radial flange 106 that extends radially outward from the main portion of the shaft 100. This exemplary configuration creates a channel 110 (FIG. 3) open aftward at an opening/gap 112 extending radially outward from an outer diameter (OD) surface 114 of the shaft to an inner diameter (ID) surface 116 of the flange 104. A base of the channel is thus formed by an aft surface 118 of the radial flange 106. An outer diameter (OD) surface of the flange 104 is shown as 120 and an aft rim of the flange 104 is shown as 122. An inner diameter (ID) surface of the shaft main portion is shown as 124.

Each of the holes 102 has an axis 510 (a radial axis in the embodiment illustrated). An exemplary count of holes 102 is 12 to 36, more broadly, 8 to 100. The larger numbers may be more appropriate to situations where the flange is more radially outboard than the illustrated example (e.g., nearer the blade roots). At one or more of the holes 102, an associated weight assembly 130 (FIG. 2) may be mounted. The exemplary weight assembly comprises a combination of a weight 132 and a threaded fastener 134 (FIG. 4). With reference to its installed condition, each weight 132 extends from a first circumferential end 140 to a second circumferential end 142 and has a forward (fore) face 144 and a rear (aft) face 146. The exemplary weight is symmetrical fore-to-aft and end-to-end so that it may be installed in either of two exactly equivalent orientations. Each weight further comprises an ID surface 150 (FIG. 5) and an OD surface 152.

Protruding from the OD surface is a boss 154 extending to a rim 156. The boss is coaxial and surrounds a passageway 158. The passageway is internally threaded. In an assembled configuration, the internal passageway receives the threaded shank 160 of the fastener 134. The exemplary fastener has a doubly convex domed head 162 (e.g., a surface 164 formed as a portion of a sphere). The shank 160 has a first end (an ID end in the installed configuration) 170 at an underside 172 of the head and a second end (OD) 174. Proximate the second end, the shank has a feature for engagement by a tool to rotate the fastener. An exemplary feature is a female feature or socket, with a hex socket shown. In an installed condition, the shank and passageway are coaxial (axis 520) with the associated hole axis 510 with the boss 150 received in the hole 102.

As discussed further below, in the installed condition, the head surface 164 contacts the main shaft portion and the OD surface 152 contacts the ID surface 116 of the flange 104 to place the fastener under compression and the radial web 106 under corresponding tension to hold the weight in place.

The exemplary implementation also includes features on the ID wall of the channel 110 (formed along the local OD surface 114 of the shaft) for registering the fastener head and thus the weight assembly. Exemplary features 180 are doubly concave recesses of complementary curvature to the surface 164 of the head. As is discussed further below, this mainly helps with installation but also may help maintain registry in use.

Figure 7:
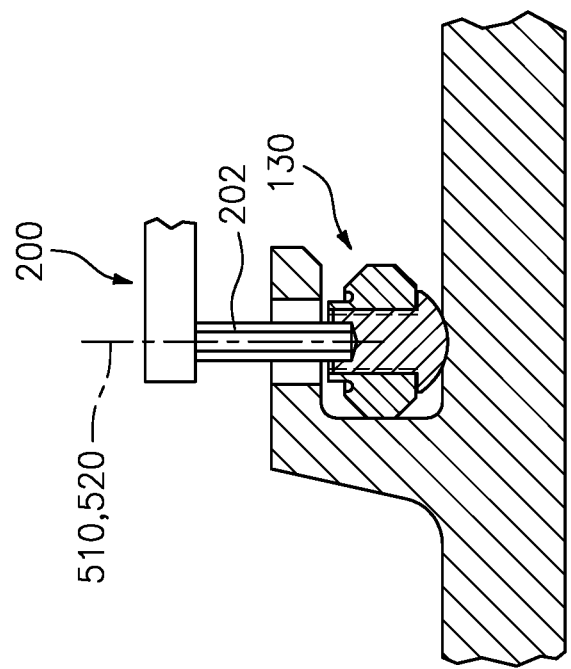
FIG. 7 is a view of the aft balancing location in an intermediate state of weight installation.
Figure 6:
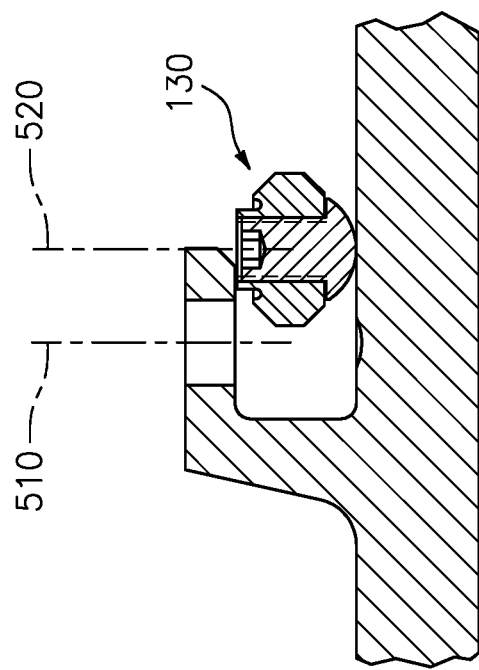
FIG. 6 is a view of the balancing location in an initial stage of balance weight installation.

An exemplary installation sequence for a given weight assembly is shown in FIGS. 6 and 7. The weight assembly is initially in a fully retracted condition (i.e., the fastener 134 is fully screwed into the weight). This may leave just enough clearance to axially insert the weight assembly through the channel opening 112. By having just enough clearance and not any substantial excess clearance, the tolerance is sufficient to maintain the weight with its axis 520 extending radially. Eventually, the weight is brought into alignment with the hole (FIG. 7). In the exemplary embodiment with recesses 180, this allows the head 162 to fit into the recess to circumferentially position the weight assembly and help retain the weight assembly against aftward extraction. In the exemplary condition, the forward face or rim 144 of the weight may contact or be in near contact with the base 118 of the channel to help position and orient the weight (maintain the weight extending circumferentially).

A tool 200 may then be installed. The tool has a bit 202 of complementary shape to the engagement feature 176 (e.g., a hex key in this example). With the bit engaged to the fastener, the bit may be rotated about the axis 510, 520 in the direction required to unscrew the fastener and thus extend the fastener from the weight. This action drives the weight radially outward with the boss 154 initially passing into the hole 102. Eventually, the weight seats against the flange and further tightening (e.g., to a predetermined torque) places the fastener under the aforementioned compression to lock the weight in place. Thereafter, the tool may be removed. Exemplary tools include hand drivers and pneumatic wrenches.

Alternative features on the fastener include polygonal sockets other than hexagonal, screw driver slots, crosses, splined features, and the like. These may also include security features such as posts within the recess. Yet further variations involve similar male features mating with a complementary female feature of the tool.

In use, a user may have access to a number of different sizes (masses) of such weights. For example, different masses may be provided by providing differing lengths between the ends 140 and 142 (FIG. 2). If the lengths are relatively short compared with the concavity of the surface 116, the OD faces 152 may be flat and simply have some combination of deformation and uneven contact. Alternatively, the OD faces 152 may have transverse convexity matching the transverse concavity of the surface 116. Exemplary weights have a length between ends 140 and 142 of approximately 6 mm to 13 mm in one exemplary implementation. An axial length or span between faces 144 and 146 may similarly be in such a range but may be fixed for all weights used in a given flange. An exemplary fastener nominal diameter is thus in the vicinity of 3 mm to 5 mm, more broadly, 2 mm to 10 mm.

A computer spin balancing method may involve the computer controlling rotation of the rotor on a balancing machine and measuring vibratory forces. Based on the measured forces, the computer instructs the user to install one or more weights of given mass(es) at given hole(s). The user does this. Thus, one or more of the holes of the flange may have weights mounted thereto and the weights may have different masses.

Exemplary weight materials are metallic (e.g., stainless steel or nickel alloy (e.g., nickel-based superalloy)). The fastener may also be of such stainless steel or nickel alloy but does not have to be the same as the weight (e.g., a stainless steel screw may be used with a nickel alloy weight). One example involves twelve mass increments with the smallest weights having an average mass (inclusive of the fasteners) of 3.75 grams and the largest having an average mass of 7.85 grams. Thus an exemplary range of such increments provides a largest mass at least twice the smallest mass. In other examples, the range can at least partially overlap a range of 2 grams to 10 grams and have a largest weight of 1.5 to 4.0 times a smallest.

An exemplary balancing procedure involves: assembling the rotor stack together and place it in the balance machine (not shown); 2. spinning to a balancing speed (e.g., 900 rpm); 3. measuring (and recording) balance (e.g., angle and amount of unbalance); 4. optionally repeating the spinning/measuring/recording one or more times for an average; applying weight(s) to correct measured (or avg. measured) imbalance (e.g., based upon computer or manual look-up table or computed best weight combination for a given imbalance); re-spinning and re-measuring balance; if balance not within target applying further weights to correct (may be done after additional re-spins/re-measurings to provide an average and may include replacing a given weight if more or less mass is indicated for a given weight position); once balance is within target, discontinuing and removing from machine.

Manufacture of the shaft and weight assembly may reflect existing techniques. For the shaft, the basic form of the flanges 106 and 104 may be formed by turning a larger piece. One or more drilling steps may form each of the holes 102 and associated recesses 180 (if present). For example, the holes might be drilled and then the recesses ground via a bit passing coaxially through the drilled hole. Or, one tool may perform both operations. In such a situation, for example, the tip of the drill could form the recess. Such recess might have more of a frustoconical shape than the illustrated doubly concave shape. In such case, the fastener might have a complementary frustoconical surface.

Similarly, conventional screw machines and forming techniques may be used to form the fasteners. The weights may be machined from bar stock. Depending upon the implementation, the external shape of the boss may be formed by a milling operation with multiple lateral passes or may be formed via a single plunge grind along the axis 520. For example, the passageway could first be drilled and could then be used to guide a plunge grind forming the outer profile of the boss and recessing the surface 152 relative to the associated initial surface of the bar stock. After the passageway is initially drilled, it may be threaded with a tap. Variations may include coatings on the weights and/or fasteners. One coating area is anti-gallant coatings on the threads (e.g., a silver plating on the female thread of the weight). A further variation used in prior art weights is to crimp the weight slightly (e.g., at the boss) after tapping so there is a slight interference when the fastener is screwed in. This interference helps maintain the fastener in place.

Relative to alternative embodiments, the exemplary configuration may offer several advantages depending on where used. Several of these advantages may accommodate limited access. A small amount of axial access is required to insert the weight through the gap 112 (FIG. 3). Depending upon driver configuration, either a small amount of radial access or a small amount of axial access may be required for the driver. For example, on the one hand, if there is great radial access but little axial access, a long driver shaft may be used extending along the axis 510, 520. On the other hand, if there is limited radial access, a right angled driver may need only a small amount of space radially past the OD surface 120 (FIG. 3).

Although the channel 110 is open axially aftward in the illustrated embodiment, other situations may have the channel open axially forward. Yet other configurations might have the channel open radially outward or radially inward (in which case, the axis 510, 520 would be parallel to the engine centerline/axis 500). Depending upon the situation, other locations on one or more of the rotors may have conventional balance weights such as those discussed above.

In the exemplary engine, the flange 104 is not scalloped. However, alternative embodiments may scallop the flange (e.g., recess the rim 122 between adjacent holes).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A rotor having:
    rotor body having:
        a flange with a circumferential array of discontiguous apertures; and
        a surface spaced apart from the flange; and
    one or more rotor balance weight assemblies, each having:
        a weight having:
            a passageway having a first end and a second end;
            an internal thread along the passageway; and
            a boss at the first end of the passageway, the boss in a respective associated one of the apertures; and
        a fastener having:
            a shank having a first end and a second end and an external thread engaged to the passageway internal thread;
            an engagement feature at the shank first end for engagement by a tool to turn the fastener; and
            a head at the second end, the head contacting the surface.

2. The rotor of claim 1 wherein:
    the circumferential array of apertures is 20-100 apertures.

3. The rotor of claim 1 wherein:
    the flange is an axial flange.

4. A rotor of claim 1 comprising:
    a rotor body having:
        a flange with a circumferential array of discontiguous apertures; and
        a surface spaced apart from the flange; and
    one or more rotor balance weight assemblies, each having:
        a weight having:
            a passageway having a first end and a second end;
            an internal thread along the passageway; and
            a boss at the first end of the passageway, the boss in a respective associated one of the apertures; and
        a fastener having:
            a shank having a first end and a second end and an external thread engaged to the passageway internal thread;
            an engagement feature at the shank first end for engagement by a tool to turn the fastener; and
            a head at the second end, the head contacting the surface,
    wherein:
        said surface has a plurality of recesses, each aligned with a respective associated one of the apertures; and
        the fastener head is in the recess associated with the associated one of the apertures.

5. The rotor of claim 4 wherein:
    each said recess is blind.

6. The rotor of claim 4 wherein:
    each said recess is doubly concave.

7. The rotor of claim 1 wherein:
    each said head lacks engagement features for tool engagement.

8. The rotor of claim 1 wherein:
    each said head is doubly convex.

9. The rotor of claim 1 wherein:
    each said engagement feature is a socket.

10. The rotor of claim 9 wherein:
    the socket is a hex socket.

11. The rotor of claim 1 wherein:
    each said weight consists essentially of stainless steel or nickel alloy.

12. The rotor of claim 1 wherein:
    each said boss protrudes from a singly convex surface portion of the weight.

13. The rotor of claim 1 wherein:
    the one or more rotor balance weight assemblies are fewer in number than the circumferential array of apertures.

14. The rotor of claim 1 wherein:
    each shank first end is subflush to a rim of the respective associated boss.

15. The rotor of claim 1 further comprising:
    a plurality of stages of blades.

16. The rotor of claim 1 wherein:
    each fastener shank is in compression between the surface and the associated weight.

17. A gas turbine engine comprising the rotor of claim 1.

18. A method for assembling the rotor of claim 1, the method comprising for each of the one or more rotor balance weight assemblies:
    with the fastener in a relatively retracted condition contacting the fastener head with the surface;
    engaging a tool to the engagement feature; and
    using the tool to turn the fastener to extend the fastener and drive the boss into the respective associated aperture.

19. The method of claim 18 further comprising:
    spinning the rotor and determining balance of the rotor and wherein the one or more rotor balance weight assemblies improve balance of the rotor.

\* \* \* \* \*